Sept. 10, 1929.　　　B. F. GOODWIN　　　1,727,342
FOOD CONFECTION
Filed May 12, 1928

INVENTOR
BENJAMIN F. GOODWIN
BY
ATTORNEY

Patented Sept. 10, 1929.

1,727,342

UNITED STATES PATENT OFFICE.

BENJAMIN F. GOODWIN, OF RIDGEFIELD PARK, NEW JERSEY.

FOOD CONFECTION.

Application filed May 12, 1928. Serial No. 277,122.

The invention relates to articles of food prepared for convenient distribution as a confection, and the object of the invention is to provide an edible package in stick form containing the food in a pasty condition, the whole adapted for consumption by the purchaser without further preparation, and which shall be palatable, wholesome and invitingly presented.

The invention consists in certain novel features of construction by which the above objects are attained, to be hereinafter described and claimed.

The accompanying drawings form a part of this specification and show the invention as it has been carried out in practice.

Similar reference numerals indicate the same parts in all the figures.

Figure 1:
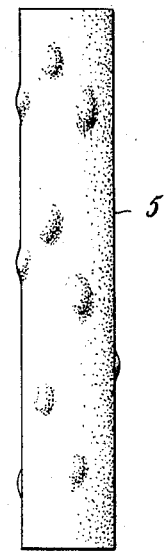
Figure 1 is an elevation or side view of the stick or confection.
Figure 2:
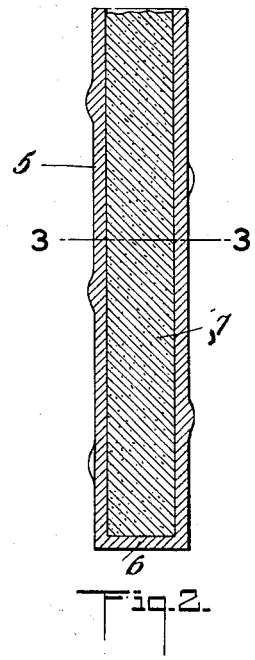
Figure 2 is a longitudinal central section of the same.
Figure 3:
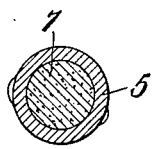
Figure 3 is a corresponding transverse section taken on the line 3—3 in Figure 2.

The confection consists of a shell 5 of substantially cylindrical tubular form, closed at one end as at 6, and a filling of peanut butter inclosed therein.

The shell 5 is formed of wafer pastry shaped and baked in suitable heated dies, of a crisp consistency analogous to the shell of the well known ice cream cone and adapted to resist penetration therethrough of the oleaginous filling 7 contained therein.

The filling 7 is of peanut butter produced by grinding the shelled kernels as usual with proper treatment in the process of manufacture by which the melting or softening point of the nut paste is raised sufficiently to insure its stability under the temperatures to which it is subjected in storing, shipping, distribution and consumption without in any manner impairing its food value or flavor.

As clearly shown in the drawing the shell is formed with exterior knobs, projections or the like 8, as seen in the different views. These knobs serve a triple purpose. They hold the shells in the mold or form when the plunger is withdrawn; they serve very effectively in preventing too close adhesion of the shells to each other when they are arranged in multiple or in sets, and furthermore they serve to be engaged by the thumb and fingers as one shell is broken from the next adjacent one of the set and thus not only prevent the weaker portions of the shell being crushed by pressure when removing one of the sticks from the adjacent one, and provide greater strength at these points.

As all the steps in the process of manufacture are performed by automatic machinery the product is eminently sanitary and uniform. The food value of peanut butter is recognized and appreciated by dieticians, and in the stick form is highly attractive to children and others and can be given in the desired exact measured quantities while avoiding the waste and untidiness due to spreading upon bread or the like, a feature of importance in serving this nutritious food at the table.

I claim:—

The new alimentary article of manufacture described consisting of a baked shell of impervious pastry in tubular cylindrical form, closed at one end, and a filling of stiff plastic peanut butter contained in said shell, the shell having exterior protuberances to serve the various functions described.

In testimony that I claim the invention above set forth, I affix my signature hereto.

BENJAMIN F. GOODWIN.